(12) United States Patent
Valsecchi (10) Patent No.: US 10,012,072 B2
(45) Date of Patent: Jul. 3, 2018

(54) MULTI-PHASE FLOW METER AND METHODS FOR USE THEREOF

(71) Applicant: Pietro Valsecchi, Houston, TX (US)

(72) Inventor: Pietro Valsecchi, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 527 days.

(21) Appl. No.: 14/375,101

(22) PCT Filed: Jan. 17, 2013

(86) PCT No.: PCT/US2013/021945
§ 371 (c)(1),
(2) Date: Jul. 28, 2014

(87) PCT Pub. No.: WO2013/141956
PCT Pub. Date: Sep. 26, 2013

(65) Prior Publication Data
US 2015/0041122 A1     Feb. 12, 2015

Related U.S. Application Data

(60) Provisional application No. 61/614,259, filed on Mar. 22, 2012.

(51) Int. Cl.
*E21B 47/10* (2012.01)
*G01F 1/10* (2006.01)
*G01F 1/74* (2006.01)

(52) U.S. Cl.
CPC ............... *E21B 47/10* (2013.01); *G01F 1/10* (2013.01); *G01F 1/74* (2013.01)

(58) Field of Classification Search
CPC ... E21B 47/10; G01F 1/10; G01F 1/74; G01P 5/07
See application file for complete search history.

(56) References Cited

U.S. PATENT DOCUMENTS

| | | | |
|---|---|---|---|
| 2,742,095 A | 4/1956 | Pitcairn et al. | |
| 4,088,022 A | * 5/1978 | Kalotay | G01F 15/068 73/861.78 |

(Continued)

FOREIGN PATENT DOCUMENTS

EP          0 301 534 A1     2/1989

OTHER PUBLICATIONS

Al-Sheikh, J.N. et al, "Prediction of Flow Patterns in Horizontal Two-Phase Pipe Flow", Can J Chem Engng, 1970, pp. 21-29, 48.

(Continued)

*Primary Examiner* — Daniel P Stephenson
(74) *Attorney, Agent, or Firm* — ExxonMobil Upstream Research Company-Law Department (57) ABSTRACT

A flow meter for measuring multi-phase flow and method of use comprising an impeller assembly having a one or more blades in an asymmetric blade configuration on a rotational shaft and one or more sensors to measure partial rotations of the blades. Sensors may obtain impeller rotational information associated with various portions of the flow stream. With this multi-phase fluid flow may be determined from the determined local velocity information, the operation of a fluid-flow system may be enhanced.

20 Claims, 5 Drawing Sheets

(56) References Cited

U.S. PATENT DOCUMENTS

| | | | | |
|---|---|---|---|---|
| 4,566,317 | A * | 1/1986 | Shakra | E21B 47/10 73/152.35 |
| 5,046,370 | A * | 9/1991 | Hall | G01F 1/12 416/243 |
| 5,251,479 | A * | 10/1993 | Siegfried, II | E21B 17/1021 73/152.29 |
| 5,561,245 | A * | 10/1996 | Georgi | E21B 47/10 324/324 |
| 5,661,237 | A | 8/1997 | Dussan V et al. | |
| 5,971,322 | A | 10/1999 | Beretta et al. | |
| 6,439,062 | B2 * | 8/2002 | Stark | G01F 1/10 73/861.77 |
| 6,601,461 | B2 | 8/2003 | Maxit et al. | |
| 6,619,585 | B1 | 9/2003 | Lidak | |
| 6,898,547 | B1 | 5/2005 | Gysling et al. | |
| 7,114,386 | B1 * | 10/2006 | Veignat | E21B 47/10 73/152.29 |
| 7,600,419 | B2 | 10/2009 | Oddie | |
| 8,205,509 | B2 * | 6/2012 | Oddie | E21B 47/10 73/152.18 |
| 2005/0229718 | A1 | 10/2005 | Cens et al. | |
| 2006/0157239 | A1 * | 7/2006 | Ramos | E21B 47/10 166/254.2 |
| 2007/0196212 | A1 | 8/2007 | Hort et al. | |
| 2008/0134774 | A1 * | 6/2008 | Oddie | G01V 11/005 73/152.01 |
| 2010/0154530 | A1 | 6/2010 | Oddie | |
| 2013/0081459 | A1 * | 4/2013 | Memiche | E21B 47/10 73/152.29 |
| 2015/0041122 | A1 * | 2/2015 | Valsecchi | E21B 47/10 166/250.15 |

OTHER PUBLICATIONS

Mandhane, J.M. et al, "A Flow Pattern Map for Gas-Liquid Flow in Horizontal Pipes", Intl. Journal Multiphase Flow, 1974, pp. 537-554, 1(4).

Nishikawa K. et al, "On the Pulsation Phenomena in Gas-Liquid Two-Phase Flow", Bulletin of JSME, 1969, pp. 1410-1416, 12.

Oshinowo, T. et al, "Vertical Two-Phase Flow, Part 1: Flow-Pattern Correlations", Can J Chem Engng, 1974, pp. 25-35, 52.

Spedding, P.L. et al, "A Simplified Method of Determining Flow Pattern Transition of Two-Phase Flow in a Horizontal Pipe," Int J Multiphase Flow, 1981, pp. 729-731, 7(6).

Weisman J. et al, "Flow Pattern Transitions in Vertical and Upwardly Inclined Lines", Int J Multiphase Flow, 1981, pp. 271-280, 7.

* cited by examiner

MULTI-PHASE FLOW METER AND METHODS FOR USE THEREOF

CROSS REFERENCE TO RELATED APPLICATIONS

This application is the National Stage of International Application No. PCT/US2013/021945, filed Jan. 17, 2013, which claims the benefit of U.S. Provisional Application No. 61/614,259, filed Mar. 22, 2012, the entirety of which is incorporated herein by reference for all purposes.

FIELD OF THE DISCLOSURE

Embodiments of the disclosure relate to the measurement of the flow rate. More particularly, embodiments of the disclosure relate to flow meters, which include an asymmetric blade configuration, and methods of use thereof to measure flow components of a multi-phase fluid.

BACKGROUND OF THE DISCLOSURE

This section is intended to introduce various aspects of the art, which may be associated with exemplary embodiments of the present disclosure. This discussion is believed to assist in providing a framework to facilitate the understanding of particular aspects of the present disclosure. Accordingly, it should be understood that this section should be read in this light, and not necessarily as admissions of prior art.

In processing fluids, the measurement of fluid flow through a passage provides information that may be utilized to manage the fluid in a more effective manner. In particular, the measurement of flow components for a multi-phase fluid may be utilized to provide information, which may be used to indicate or troubleshoot a problem and/or adjust settings to enhance operations. These flow measurement devices may be utilized in enclosed passages, such as conduits, wellbores, or other defined fluid flow paths. In particular, measurement of flow components in production logging can provide information about the properties of the produced well fluid. This information may be utilized to identify potential problems (e.g., water intrusion and/or cross contamination) and/or determine the fluids being produced from various zones within the reservoir. As a result, equipment settings may be adjusted and/or maintenance may be performed to enhance fluid production, such as petroleum production.

To provide flow measurements, various devices may be utilized within the flow passage to collect flow measurement information. One such device is a heat-pulse flow meter (HPFM), which heats a volume of fluid within the passage. This flow meter has one or more sensors disposed within the flow meter to measure the temperature for given periods of time. The changes in temperature indicate that the heated fluid is flowing within the passage, which is utilized to determine a rate of flow and direction of flow at that particular location and time. However, the operation for this type of device may be limited because it is stationary during the measurements and it has a limited range of flow rates it can measure. Further, as it involves heating a volume of fluid, it is not useful for environments where higher temperatures and/or higher flow rates are present. Moreover, the obtained measurement for this device is dependent on the calibration (which is dependent on the heat capacity coefficient of the measured fluid) and fluid properties of a mixture of different fluids with unknown volume fractions (such as the case for multi-phase flows) cannot be determined.

Another flow measurement device is an electromagnetic flow meter (EMFM). This flow meter generates a magnetic field to measure the fluid flow through the flow meter. The generated voltage is utilized to determine the rate of flow and direction of flow at that particular location and time. However, this measurement device is based on the conductive properties of water and is not useful for tracking the flow of hydrocarbons. Additionally, this type of device is limited in the range of flow rates it can measure based on its configuration.

Yet another type of flow measurement device is a spinner or impeller flow meter. The spinner flow meter typically has an impeller or propeller assembly with a symmetric distribution of two or more blades that revolve around a shaft in response to fluid flow. A sensor may be utilized to determine the revolution speed, which is used to determine the rate of flow and direction of flow at that particular location and time. These measurements may be made while moving the flow meter through an enclosed passage or at a stationary position within the enclosed passage. The spinner flow meter provides a wider range of flow rates, but typically has limited accuracy for low flow rates (e.g., less than 5 feet per minute).

Each of these flow meters may be utilized in different environments to provide information about fluid flow. For example, flow measurements from flow meter log data may be obtained and analyzed in hydrocarbon production to provide qualitative and quantitative reservoir characteristics. The temperatures in the wellbores may include temperatures in the range of 0° C. to 630° C., or −17° C. to 350° C. and the pressures within these zones may include 0 to 1000 atmospheres gauge (0 kilo Pascal gauge to 100 mega Pascal gauge). Differences in pressure produce fluid flow into the wellbore and within the wellbore toward the surface. The flow measurements may be utilized for the hydraulic analysis of zones, the enhancement of reservoir models, or the design and implementation of well completions.

While the spinner flow meter is more suitable for certain environments, such as hydrocarbon production operations, the conventional spinner flow meters fail to properly measure the flow when multiple phases are present. As an example, a typical production logging tool string includes various components, including one or more flow meters. A typical spinner flow meter consists of a multi blade impeller, which is disposed at the center of a housing (e.g., a tubing member) by stabilizers. The housing protects the impeller from contact with the walls of the enclosed passage, may maintain the impeller within the center of the enclosed passage, and may provide paths for fluids to contact the blades of the impeller assembly. As the velocity of the fluid flow varies over the cross area of the enclosed passage (e.g., being about zero at the wall to a maximum at the center), the multi-blade impeller should be maintained in the center of the housing to provide accurate measurement of flow. The rotation speed of the blades can be correlated to the average fluid flow speed through the enclosed passage.

While this configuration measures the fluid flow rate properly for single-phase flow, the fluid flow regime in hydrocarbon production systems, such as within a wellbore, often consists of multiple phases, such as a mixture of oil, gas and/or water. As such, the composition of fluid being produced (i.e., production fluid) is a result of a wellbore crossing multiple production zones, where different components (e.g., oil, gas, or water) enter the wellbore and contribute to the production fluid flow. As an example, dissolved gas eventually separates as the pressure decreases (e.g., gas is dissolved at greater depths within the wellbore that are subject to higher pressures compared to shallower depths). Accordingly, the composition of production fluid and flow regime may change at different locations, as the volume fraction of the different components (oil, gas and/or water) varies along the wellbore. Depending on the relative volumetric fraction of the liquid phase and gas phase, the flow regime can include a wide spectrum of flows. For substantially horizontal portions of a wellbore, the flow regimes may include a dispersed bubble flow (e.g., evenly distributed gas bubbles are suspended in a predominantly liquid flow), plug flow (e.g., elongated bubbles), slug flow, stratified smooth flow or stratified wavy flow (e.g., liquid and gas flow in two distinct layers) or annular flow. See, e.g., J. M. Mandhane, C. A. Gregory and K. Aziz, "A Flow Pattern Map for Gas-Liquid Flow in Horizontal Pipes," Int. J. Multiphase Flow, 1(4), pp 537-554, 1974. The occurrence of specific multi-phase flow regimes also depends on other factors, such as conduit or tubing orientation and size, overall production rate, pressure, and temperature. Consequently, different flow regimes may be present at different locations along the same well at the same time.

Further, the multiple phases may also pass through the wellbore at different velocities. As an example in a horizontal wellbore, the gas phase of a stratified flow is located in the upper region of wellbore and has a velocity that may be higher compared to the liquid phase flowing in the bottom portion of the wellbore. For slug flow, the liquid phase and gas phase are separated and form an intermittent sequence of different phases. The phases produce a time-dependent behavior of the local velocity whereby the liquid phase may recirculate as the gas phase (e.g., bubbles) passes through the wellbore. Thus, the flow regime is determined from the velocity variation at a given location, which depends on the boundary conditions and the different densities and viscosities of the fluid.

The flow regime complicates the measurement of the flow regime with conventional spinner flow meters, as they do not properly account for multi-phase flows. That is, conventional spinner flow meters fail to provide accurate measurements because the correlation between rotation speed and actual flow speed is based on fluid properties (e.g., density and viscosity) for specific single-phase flows. Indeed, the use of such flow meters requires a previous knowledge of the fluid to be measured (e.g., composition of water, oil, and/or gas) and the inadequacy of a conventional spinner flow meter for multi-phase flows is evident as the definition itself of local flow velocity blurs. Consequently, the accuracy of measurement quickly decays in regions where multi-phase flow is encountered by the flow meter. Although production logging spinner flow meters are used to log both single-phase and multi-phase flows in producing wells, the identification of the regions with multi-phase flow is challenging. The spinner flow meter responses to multiple phase flow are difficult to interpret, and often lead the operator to discard log data from regions where multi-phase flow is suspected. Moreover, signal filtering processes are commonly built in the monitoring system to hide such inaccuracy, which may result in incorrect interpretations of the well dynamics.

As the operation and surveillance of production systems rely, in part, on the accurate measurement of the contribution of each of the phases in the flow regime to the overall production flow, a need exists to enhance the information collected in systems that have multi-phase flow. Further, an enhanced system, which may be utilized to determine cross flows present between zones and/or water entering the wellbore from one or more zones, may also be beneficial.

SUMMARY OF THE DISCLOSURE

In some embodiments, the present disclosure relates to a flow meter for measuring multi-phase flow. The flow meter comprises an impeller assembly having a shaft assembly, wherein the shaft assembly comprises a shaft and the impeller assembly comprises: one or more blades in an asymmetric blade configuration and configured to impart rotation of the shaft from forces caused by contact with a fluid (or to rotate by fluid flow contact with blades in the impeller assembly), and one or more sensors associated with the one or more blades and configured to obtain measurement data associated with fluid flow for a partial torsion or partial rotation of different portions of the shaft corresponding to the locations where the blades are fastened to the shaft. The sensors may be configured to measure the relative rotation (e.g., torsion) and/or the total rotation of the shaft.

In yet another embodiment, a hydrocarbon production system is described. The system may comprise a wellbore accessing one or more intervals within a subsurface formation; a measurement device disposed within the wellbore, the measurement device comprising a flow meter having one or more blades in an asymmetric blade configuration and configured to impart rotation of the shaft from forces caused by contact with a fluid, wherein the flow meter is configured to obtain measurement data associated with the fluid flow through the flow meter for a partial rotation of the one or more blades; and a central processing unit in communication with the measurement device and configured to: receive data, wherein the data comprises one or more of (i) an indication of the measurement data, and (ii) the measurement data; and process the received data to determine the fluid flow within the wellbore.

In still yet another embodiment, a method of managing fluid flow within a passage is described. The method comprises: traversing a flow meter through a fluid flow within a passage, wherein the flow meter comprises one or more blades in an asymmetric blade configuration and configured to rotate based on the fluid flow within the passage adjacent to the flow meter, wherein the flow meter is configured to obtain measurement data associated with the fluid flow for a partial rotation of the one or more blades; and calculating fluid flow within the wellbore based on the measurement data.

In other embodiments, the flow meter may be utilized with other flow meters, such as symmetric flow meters or other asymmetric flow meters. For example, a secondary impeller assembly comprising: one or more secondary blades in a second asymmetric blade configuration and configured to impart rotation of the shaft from forces caused by contact with a fluid (or to rotate by fluid flow contact with blades in the impeller assembly), and one or more secondary sensors associated with the one or more secondary blades and configured to obtain secondary measurement data associated with fluid flow for a partial torsion of different portions of the shaft corresponding to the locations where the secondary blades are fastened to the shaft. The one or more secondary sensors may be configured to obtain secondary measurement data; wherein the central processing unit is configured to: receive secondary data, wherein the secondary data comprises one or more of (i) an indication of the secondary measurement data, and (ii) the secondary measurement data; process the received secondary data to determine the multi-phase fluid flow properties at each location along the well (volume fraction and local velocity of each phase). As another example, the measurement device may further comprise a symmetric flow meter having one or more blades in a symmetric blade configuration and configured to rotate based on fluid flow through the symmetric flow meter, wherein the flow meter is configured to obtain symmetric measurement data associated with the fluid flow through the symmetric flow meter; and wherein the central processing unit is configured to: receive symmetric measurement data, wherein the symmetric measurement data comprises one or more of (i) an indication of the symmetric measurement data, and (ii) the symmetric measurement data; and process the received symmetric data to determine local velocity of the fluid within the wellbore.

In one or more embodiments, various aspects may be adjusted. For instance, the fluid flow within the wellbore is multi-phase fluid flow and/or the passage may be a wellbore. The flow meter may comprise one or more sensors configured to collect the measurement data and the one or more sensors comprise one or more of a speedometer, a strain gauge sensor and a torsional sensor. The flow meter may be configured to obtain measurement data for five or more time intervals per rotation of the one or more blades, or for ten or more time intervals per rotation of the one or more blades. Further, the one or more blades may consist essentially of a single blade and counter weight. Also, the system or method may involve calculating the velocity of each phase of the fluid flow using the measurement data from the flow meter and/or calculating the volume fraction of each phase of the fluid flow relative to the total volume of the fluid flow within the passage.

BRIEF DESCRIPTION OF THE DRAWINGS

The foregoing and other advantages of the present disclosure may become apparent upon reviewing the following detailed description and drawings of non-limiting examples of embodiments.

FIGS. 3A to 3C are exemplary graphs of the variation of velocity of flow and torque over a rotation of the impeller assembly according to an exemplary embodiment of the present techniques.

DETAILED DESCRIPTION OF THE DISCLOSURE

In the following detailed description section, the specific embodiments of the present disclosure are described in connection with preferred embodiments. However, to the extent that the following description is specific to a particular embodiment or a particular use of the present disclosure, this is intended to be for exemplary purposes only and simply provides a description of the exemplary embodiments. Accordingly, the disclosure is not limited to the specific embodiments described below, but rather, it includes all alternatives, modifications, and equivalents falling within the true spirit and scope of the appended claims.

Various terms as used herein are defined below. To the extent a term used in a claim is not defined below, it should be given the broadest definition persons in the pertinent art have given that term as reflected in at least one printed publication or issued patent.

As used herein, the term "enclosed passage" or "conduit" includes pipe, channel, enclosed duct, tubular member, casing, wellbore, and/or other passage having defined boundaries.

Further, as used herein, the term "multi-phase flow" or "multi-phase fluid flow" is the simultaneous flow of two or more immiscible fluids with different properties (e.g., oil, gas and/or water). The term "single-phase flow" is used herein to indicate any flow where only one type of fluid is present (e.g., oil, gas or water).

The term "phase regime" or "multi-phase regime", as used herein, describe the different possible flow configurations of a multi-phase flow, which include stratified flow, plug flow, slug flow, bubble flow, etc.

As used herein, the term "asymmetric" means the lack of regularity in the azimuthal direction (or the curvilinear direction around a rotation axis).

The term "local velocity", as used herein, means the velocity of the fluid at a specific location through the enclosed passage. This corresponds to the average value of the velocity across the cross section of the enclosed passage and is valid for single-phase flows. For multi-phase flow the components of the mixture may exhibit different local velocities at the same location along the enclosed passage, each of the phases being one fluid in a mixture of multiple immiscible fluids. The overall local velocity for a multi-phase flow can be defined as the weighted average of the local velocities of all components at each specific location along the well.

The flow measurements provided by conventional spinner flow meters is based on measurement systems that average the signal over a time period involving multiple revolutions. Typically, the average corresponds to ten or more rotations or the impeller. This averaging is performed to lessen the effects of noise (e.g., a consistent noise filter) and is useful for sufficiently steady-state single-phase flow measurements. A further noise reduction may be accomplished by the mechanical inertia of the rotating assembly in conventional spinners. When multiple phases are present in a flow, however, acquisition filters and mechanical inertia in conventional spinners may introduce loss of accuracy in the measurement because the local velocities of the different phases may differ (e.g., the gas phase may have a higher velocity than the liquid phase flowing through the same passage).

In contrast to conventional techniques, the present techniques provide an enhanced process for extracting and utilizing information on fluid flows inside enclosed passages. The flow meter measures flow information of single-phase flows with at least the same accuracy as conventional flow meters. However, the flow meter may be utilized to enhance the quality and the accuracy of fluid flow information in the case of multi-phase flow. To achieve this enhancement, the flow meter includes an asymmetric blade configuration that provides additional information about the multi-phase flow regime. The asymmetric configuration of the impeller or propeller is characterized by a lack or absence of axial symmetry. In other words, the arrangement of the blade along the azimuthal direction does not exhibit any regularity.

That is, the arrangement of the blades over the full arc (360 degrees) cannot be represented by a repetition of any subset of the full arc. As an example, one or more embodiments may include a single-blade configuration that is balanced with a counterweight. As another example, embodiments may include two blades disposed adjacent to each other with less than 180 degree of separation between the two blades. Regardless of the specific configuration, the flow meter may be utilized to enhance the measurement of the fluid flow rate within the enclosed passage; identify the phase regime; identify the direction of fluid flow; identify the variations in velocity of different phases within the multi-phase flow; determine hydraulic gradients; and/or identify one or more sources of undesired fluids (e.g., water).

The term "propeller" and "impeller" are here used interchangeably, while the term "asymmetric impeller" indicates an assembly having one or more blades fastened substantially perpendicularly to a shaft and the blades having an asymmetric configuration relative to the cross section perpendicular to the shaft. That is, the arrangement of blades along the azimuthal direction does not exhibit any regularity. For example, the arrangement of the blades over the full arc (360 degrees) cannot be represented by a repetition of any subset of the full arc. In particular, the arrangement of the blades may include a single blade or two or more blades. For embodiments including two or more blades, the angular measurement (in degrees) between the first blade and a subsequent blade is different by greater than 20% from the angular measurement (in degrees) between the subsequent blade and the first blade or another subsequent blade. For example, in a two blade configuration, the angular measurement (in degrees) between the first blade and a second blade may be 180−18=162 degrees or less, while the angular measurement between the second blade to the first blade is may be 180+18=198 degrees or more. As another example, three blades, may be arranged such that the angle between the first blade and the second is 120 degrees, the angle between the second and the third is 120−24=96 degrees and, consequently, the angle between the third blade and the first one is 120+24=144 degrees. As may be appreciated, the shaft may be implemented as different components that are coupled together, such as a collar that engages with the shaft to rotate.

Further, as noted above, the local velocity for single-phase flow is defined at each location along an enclosed passage, while each phase or component of multi-phase flows may exhibit a different local velocity at each location along the enclosed passage. Consequently, a blade in an impeller assembly spinning within a single-phase flow may encounter the same flow speed along the rotation and for an extended number of revolutions, while a blade in an impeller assembly spinning within a multi-phase flow may encounter different velocities over each one single revolution, as the blade contacts different phases, which may be at different velocities. Accordingly, obtaining measurements with a frequency sufficiently high that it can capture variations over one impeller revolution can provide additional information that may enhance the identification of the local flow regime (e.g., flow regime for a specific segment or portion of the enclosed passage). For example, measurements of the variations of rotation speed over one single revolution may be utilized to enhance the quantity and the quality of the information on the fluid flow through an enclosed passage. As an example, if an asymmetric blade configuration is exposed to different phases along its rotation, such as in a stratified flow regime, the variation of rotation speed can be detected and thus correctly interpreted to provide additional insight regarding the different phases and the flow regime. Various aspects of the present techniques are described further in FIGS. 1 to 5.

Figure 1:
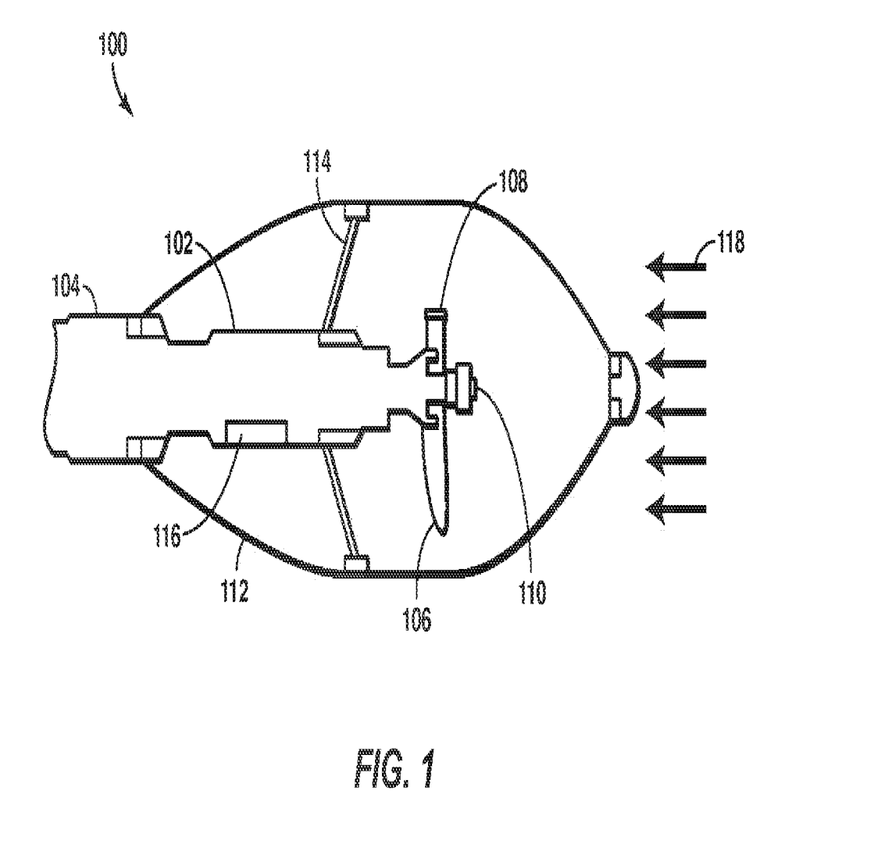
FIG. 1 is a functional schematic of a spinner flow meter according to an exemplary embodiment of the present techniques.

As one exemplary embodiment, FIG. 1 is a functional schematic of a spinner flow meter. In this embodiment, the spinner flow meter 100 may include a an impeller assembly having a shaft assembly 102, which may include or may be associated with data acquisition unit 116 having a processor, memory and set of computer instructions stored in the memory and executed by the processor to obtain measurement data and transmit an indication related to the measurement data to a central processing unit. At one end of the shaft assembly 102 may be a coupling member 104, which is utilized to connect the spinner flow meter with other tools, wireline, other flow meters and/or other equipment. The various components of the spinner flow meter may be fabricated from materials known to those skilled in the art.

At the other end of the shaft assembly 102 opposite the coupling member 104, the impeller assembly may include one or more blades 106, one or more counter weights 108, and one or more sensors 110. The impeller assembly may include an asymmetric blade configuration of one or more blades 106 to enhance the information (e.g., measurement data) collected from the fluid flow within the enclosed passage. The impeller assembly may also include one or more shafts or a shaft assembly. The blades may be coupled to the shaft or a collar that engages with the shaft. The lack of axial symmetry in the blades 106 of the asymmetric impeller assembly may result in a weight distribution having the center of gravity not on the rotation axis. Consequently, the application of one or more counterweights 108 may be utilized to balance the blades for an individual impeller assembly. Alternatively, counterweights may be applied to balance an assembly of multiple asymmetric impellers on the same shaft, for other embodiments. Balancing a blade with one or more counter weights is known in the other art areas, as described in U.S. Pat. Nos. 2,742,095; 5,971,322 and 6,619,585. Accordingly, while these balancing techniques are related to a different technical area, similar balancing techniques may be utilized with the flow meter. Accordingly, an impeller assembly that has asymmetry (or no axial-symmetry) offers a wide range of possibilities, including the possibility of multiple impeller stages along the shaft, which may be utilized to enhance information collected within a passage.

The rotation of the impeller assembly results from the force imparted by the blades on the shaft via interaction with fluids moving relative to the blades. Therefore, the impeller assembly may rotate as a consequence of its movement through the enclosed passage (e.g., a wellbore or casing) and from its interaction or contact with any fluids flowing through the enclosed passage. Blade design may be optimized for a specific fluid (e.g., identified by fluid density and fluid viscosity) and for a specific velocity range to provide a preferred response to fluid forces and reduce trailing wakes. Accordingly, the blade configuration may be adjusted and utilized based on various operating conditions within the passage because each blade has an optimal flow velocity and is designed for a certain fluid density. Further, as the different phases may have different velocities, the optimal blade configuration for liquid phase flow and for gas phase flow may be different. Consequently, the design of the blades may be targeted to obtain an extended range of operability whereby the response of the blade can be acceptable for different fluid phases (e.g., liquid and gas). Alternatively, one or more different impeller assemblies may be utilized with blades in the different impeller assemblies configured to be optimal for certain fluids, which are discussed further below.

The one or more sensors 110 in the impeller assembly may be utilized to measure different information relating to the fluid flow. These sensors 110 may include one or more speedometers, strain gauges and/or torsional sensors. As the partial rotation of each impeller with respect to each other is due to the torsion of the shaft, the sensors 110 may be configured to measure the relative rotation (e.g., torsion) and/or the total rotation of the shaft. Measuring the transition of the one or more blades from one phase to another phase over each single rotation can be performed in a variety of different means. As an example, if the blade configuration includes one blade, the rotation speed can be directly measured and the variation of rotation speed can be associated with the different phases of fluid flow. Based on the cross sectional area of the enclosed passage, the measured data may be utilized to determine the extent of the cross sectional area occupied by each phase within the enclosed passage. For this configuration, the one or more sensors 110 should measure the angular position and detect the blade's position within a certain tolerance range, which may be few degrees. The one or more sensors 110 may be utilized to determine variations in flow rates over multiple rotations and/or flow rates over fractions or portions of a rotation.

To provide the instantaneous measurement data, one or more sensors 110 obtain measurement data (e.g., angular measurements and/or torque measurements) regarding the flow for multiple intervals of each individual rotation of the blade. The measurement data may be obtained two or more times per revolution, more than five times per revolution, and/or more than ten times per revolution. As an example, the blade configuration may rotate at a maximum speed of 3000 revolutions per minute (rpm). Accordingly, to obtain ten measurements per revolution, sensors should be able to capture 500 measurements per second.

For the impeller assembly, various factors should be considered to provide the measurement data. First, the blade may be designed to be sufficiently efficient at different Reynolds numbers to account for the continuous change between phases (e.g., different velocity, density, and viscosity) over the same revolution. When the blade encounters the liquid phase, the Reynolds number can be as low as 100, whereas in the gas phase the Reynolds number can reach 100,000. Second, the impeller assembly (e.g., one or more blades, sensors, counter weights and shaft assembly (e.g., shaft with blades coupled to it)) should be configured to have a minimal amount of weight to respond to rapid changes in flow velocity over the same revolution. Third, the impeller assembly should have low mechanical resistance to be able to move with lower density fluid flow (e.g., gas phase flow). Fourth, the sensors should obtain measurement data for partial rotations, which may include multiple measurements (e.g., five, ten, twenty, one hundred, five hundred or more) per revolution of the impeller. The sampling may vary for different configurations.

Once the measurement data is obtained, the one or more sensors 110 may provide the measurement data to a data acquisition unit 116 or transmit the data to a central processing unit (not shown), or store the data locally in a data storage unit (not shown). The data acquisition unit 116 may include electronic components and/or the set of instructions that are utilized to store, process and/or transmit the measurement data. The data acquisition unit 116 may be located within the flow meters because transmitting the measurement data to the surface may be problematic. The data acquisition unit 116 may include a processor, memory in communication with the processor and a set of instructions stored on the memory and accessible by the processor. The processor may execute the set of instructions, which when executed by the processor, are configured to store the measurement data, process the measurement data into processed measurement data, store the processed measurement data and/or transmit an indication related to the processed measurement data to the central processing unit. Processing the measurement data into the processed measurement data may involve calculating the phase fractions of the fluid flow for each revolution, calculating the velocity for each of the phases of the fluid flow for each revolution, and/or detecting the fluid properties of the fluids for each phase.

To maintain the impeller assembly at a certain location within the enclosed passage, various stabilization members may be utilized in certain embodiments. As an example, one or more stabilizer members 112 may be disposed between the impeller assembly and the surfaces forming the enclosed passage. These surfaces may define the fluid flow path for the passage, such as a conduit, wellbore walls, casing or the like. To prevent the stabilizer members 112 from contacting the blades 106, one or more support members 114 may be coupled between the stabilizer member 112 and the shaft assembly 102 and/or the other portions of the impeller assembly. These support members 114 may be angled toward the flow, which is indicated by the arrows 118, within the passage to provide further support to the stabilizer member 112.

Figure 2A:
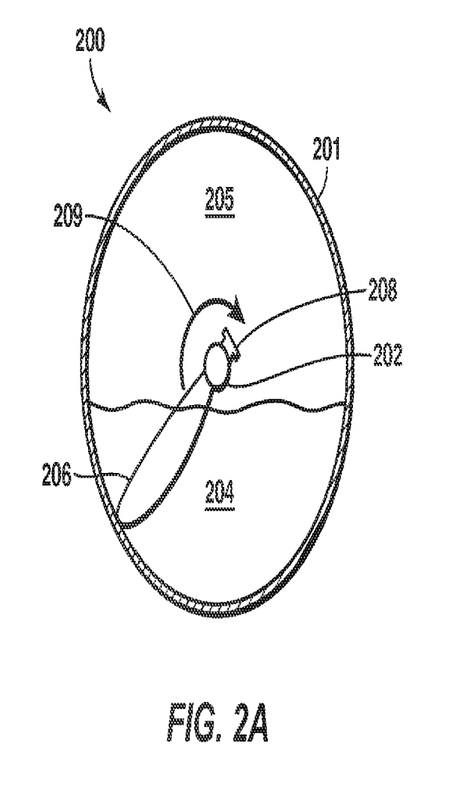
FIGS. 2A and 2B are simplified functional schematics of a spinner flow meter according to an exemplary embodiment of the present techniques within an enclosed passage.
Figure 2B:
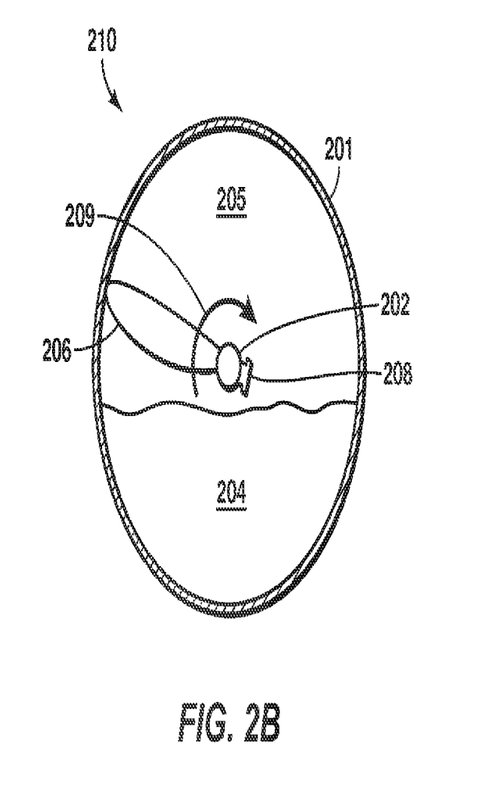

FIGS. 2A and 2B are simplified functional schematics of a spinner flow meter according to an exemplary embodiment of the present techniques within an enclosed passage, such as a wellbore. In the embodiment 200, the enclosed passage 201 is shown having a stratified flow regime of a liquid phase fraction 204 and a gas phase fraction 205. A single blade 206 and counter weight 208 rotate around a shaft 202 in the direction indicated by the arrow 209. This blade configuration is an asymmetric configuration that results in the blade 206 being subjected to the different fluid flows of the liquid phase fraction 204 and a gas phase fraction 205 during its revolution. In contrast to a conventional symmetric blade configuration (e.g., having two or more blades spaced substantially regularly along the azimuthal direction), this single blade 206 (which is one embodiment of an asymmetric impeller) does not average the multi-phase effect because the blade 206 is subjected to the different phases at different times during its revolution. For example, the single blade 206 interacts with one fluid phase for a certain fraction or portion of its revolution and is therefore subjected, throughout that portion of the revolution, to a specific force, dictated by the density of the phase it is in contact with and by the speed of the respective phase. As it enters a different portion of its revolution where the phase is different, the force on the blade changes based on that phase. Immersed in the same multi-phase flow, a symmetric impeller with blades regularly distributed along the azimuthal direction has blades simultaneously in contact with different phases, which eliminates the measured variations relating to the different local velocities of the different phases.

Accordingly, the measured response of the blade 206 may fluctuate as it rotates over each rotation period or revolution. The fluctuations of its rotation speed are based on the different force applied to the blade in the different phases. The difference in the force is based on the different densities of the phases (e.g., the liquid phase fraction 204 being more dense than the gas phase fraction 205) and/or the different velocities of the phases (e.g., the liquid phase fraction 204 having a lower fluid flow velocity than the gas phase fraction 205. In this example, the force transmitted by the liquid phase fraction 204 on the blade 206 is larger than the force transmitted by the gas phase fraction 205. As the blade 206 moves through the liquid phase fraction 204, it rapidly accelerates and then it decelerates as it moves into the gas phase fraction 205. The detection of such variation can be carried out by measuring the torque from the blade 206 to the shaft 202 over each individual rotation. Alternatively, it can be measured by capturing the variations of rotation speed of the shaft 202.

FIG. 2B is another simplified functional schematic of a spinner flow meter with the blade 206 rotated about the shaft 202 to be in contact with the gas phase fraction 205 and not in contact with the liquid phase fraction 204. In the embodiment 210, the single blade 206 and counter weight 208 rotate around a shaft 202 in the direction indicated by the arrow 209, which has the blade 206 in direct contact with gas phase fraction 205. Accordingly, if the gas phase fraction 205 has a higher flow velocity compared to the liquid phase fraction 204, the blade may rotate around this portion of the shaft 202 at a faster speed. This variation in the rotational speed for the different segments or fractional rotations may be measured by one or more sensors in the flow meter.

Figure 3A:
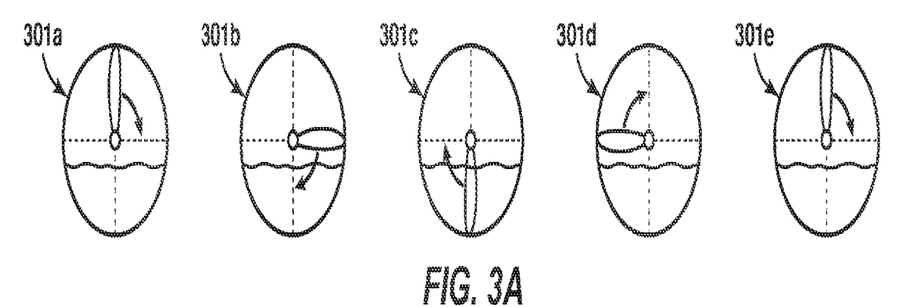
Figure 3B:
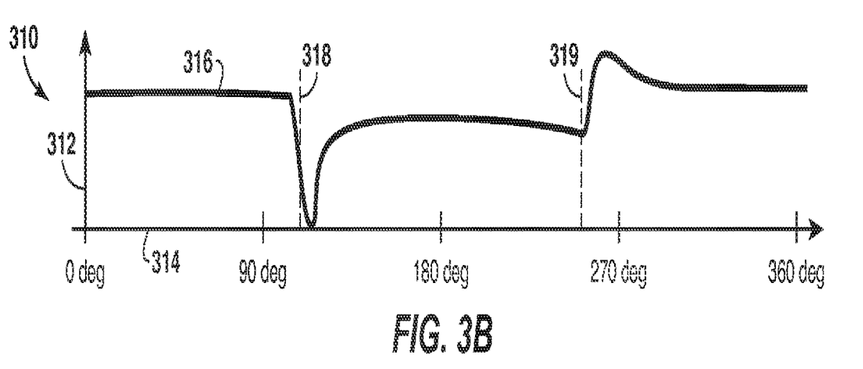

FIGS. 3A to 3C are exemplary graphs of the variation of velocity of flow and torque over a rotation of the impeller assembly according to an exemplary embodiment of the present techniques. FIG. 3A provides simplified functional schematics of a spinner flow meter at various stages in the rotation that correspond to the graphs 310 and 320 below. Specifically, the spinner flow meter 301a is at 0 degrees relative to the initial state, the spinner flow meter 301b is at 90 degrees from the initial state, the spinner flow meter 301c is at 180 degrees from the initial state, the spinner flow meter 301d is at 270 degrees from the initial state, and the spinner flow meter 301e is at 360 degrees from the initial state, which may also be considered 0 degrees (e.g., the complete rotation of the blade).

FIG. 3B is an exemplary graph 310 of the variation of torque on the shaft over a rotation of the impeller assembly according to an exemplary embodiment of the present techniques. In this graph 310, the amplitude of the torque is shown along the torque axis 312, rotation of the blade relative to an initial state is shown along axis 314 in degrees (deg). In this graph 310, one complete revolution of the blade is indicated by the period from the interception of axis 312 by axis 314 to the mark indicated as 360 degrees. The torque on the shaft is indicated by the torque response 316 at various locations along the rotation, which varies based on the fluid present within the enclosed passage. For instance, the blade, as indicated in spinner flow meters 301a and 301b, are in the gas phase for the period from 0 degrees to the dashed line 318. During this period, the torque on the shaft is approximately constant. In a subsequent period, which is indicated from the dashed line 318 to the dashed line 319, the blade is in contact with the liquid phase, as indicated by spinner flow meter 301c. In this period, the torque on the shaft fluctuates and then stabilizes at a lower torque than that experienced in the previous period. In a final period for the rotation, which is indicated by the period from the dashed line 319 to the 360 deg mark, the blade is subjected to the gas phase, as indicated by spinner flow meters 301d and 301e. Over this period, the torque on the shaft fluctuates and then stabilizes at a higher torque than that experienced in the previous period, which is similar to the torque experienced in the first period. As may be appreciated from FIG. 3B, over a single revolution, the detected torque at the shaft of the impeller assembly changes as a result of the different velocity of flow and the velocity of the blade, which is discussed further in FIG. 3C below.

FIG. 3C is an exemplary graph 320 of the variation of velocity of flow over a rotation of the impeller assembly according to an exemplary embodiment of the present techniques. In this graph 320, the amplitude of the velocity is shown along the velocity axis 322 and rotation of the blade relative to an initial state is shown along axis 324 in degrees (deg). In this graph 320, one complete revolution of the blade is indicated by the period from the interception of axis 314 by axis 312 to the mark that indicates 360 degrees. The different velocities of different components are indicated for the different locations around the rotation of the blade, such as the rotational speed of the blade is indicated by rotation speed response 325, the fluid density encountered by the blade is indicated by density response 326, and fluid velocity is indicated by fluid velocity response 327. These responses 325-327 varies based on the fluid present within the enclosed passage. For a first period, the blade, which is indicated in spinner flow meters 301a and 301b, is in the gas phase for the period from 0 degrees to the dashed line 328. During this period, the fluid density is low, fluid velocity is high and rotational speed of the blade is high. In a subsequent period, which is indicated from the dashed line 318 to the dashed line 319, the blade is in contact with the liquid phase, as indicated by spinner flow meter 301c. In this period, the fluid density is higher than the first period (e.g., as a liquid typically has a higher density than a gas), the fluid velocity is lower compared to the first period, and rotational speed of the blade is lower than the first period. In a final period for the rotation, which is indicated by the period from the dashed line 319 to the 360 degree mark, the blade is subjected to the gas phase, as indicated by spinner flow meters 301d and 301e. Over this period, the fluid density is lower than the second period and similar to the first period, the fluid velocity is higher than the second period and similar to the first period, and the rotational speed of the blade is higher than the second period and similar to the first period.

As shown by these graphs 310 and 320, over period of a single revolution, the torque changes and the rotation speed of the blade also changes as a result of the different velocity of fluid and density of the fluid. The one or more sensors may be utilized to measure the torque, velocity of the flow and/or velocity of the blade at a plurality of locations over a revolution. That is, the sensors may be configured to measure peak amplitudes and/or average amplitudes, for example, over a fraction of a single revolution (e.g., for certain time points or time windows during a revolution). The measurement data (e.g., angular measurements and/or torque measurements) is associated with the flow for the fractions of a single rotation of the blade, which may be averaged for a specific time interval or may be a discrete measurement at a specific time interval. The torque and velocities for the first and third periods indicates that the blade may be in a gaseous phase fraction, while the torque and velocities for the second period indicate that the blade may be in a liquid phase fraction.

In one or more embodiments, two or more asymmetric impellers may be utilized together within a flow meter to further enhance the flow rate information. The addition of another spinner flow meter having an asymmetric blade configuration may enhance the accuracy of the detection and increase the information set on the local flow. Because blades are optimized for one fluid, the presence of multiple asymmetric impellers whose asymmetry is properly distributed along the azimuthal direction may enhance the overall response to the multi-phase flow. In a configuration with multiple asymmetric impellers, each impeller can be designed to be optimal for a different fluid or phase. In this blade configuration, the rotation velocity of the blade may remain sufficiently constant and the torque between blades can be measured, as it varies over each rotation. The one or more sensors should measure the torque between blades for the blade configurations. Each of the torque sensors may be disposed on the shaft member and associated with one of the asymmetric blade configurations. The torque sensors may detect the change in force experienced by the blade as it interacts with different phases in the enclosed passage. Again, at least one counter weight is utilized on the shaft to maintain the center of gravity on the rotation axis for the entire assembly. Examples of various exemplary embodiments of one or more asymmetric impeller assemblies are described further in FIGS. 4A to 4D.

FIGS. 4A, 4B, 4C and 4D are simplified functional schematics of different configurations of a spinner flow meter according to exemplary embodiments of the present techniques. These figures include different configurations that utilize two or more impeller assemblies in different regions of an enclosed passage. These different impeller assemblies may each have one or more blades disposed within a stabilizer member and the blades may rotate around a shaft associated with the respective impeller assembly. Also, each of the impeller assemblies may include one or more sensor configured to collect measurement data at various intervals over each revolution for the respective impeller assemblies or for the group of impeller assemblies.

Figure 4A:
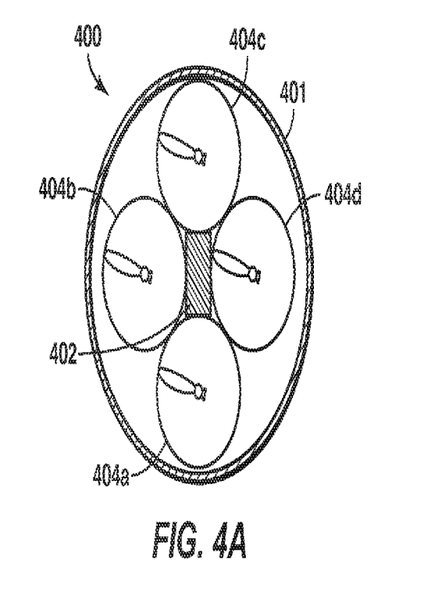
FIGS. 4A, 4B, 4C and 4D are simplified functional schematics of different configurations of a spinner flow meter according to exemplary embodiments of the present techniques.

Specifically, FIG. 4A is a configuration 400 of four asymmetric impeller assemblies 404a-404d coupled together with a support member 402 and disposed within an enclosed passage 401. In this configuration 400, the asymmetric impeller assemblies 404a-404d are distributed in different regions of the enclosed passage 401 to contact fluids within different regions of the enclosed passage. The different impeller assemblies 404a-404d may be utilized to provide information about the different regions, which may enhance the measurement data, as these impeller assemblies may be utilized to provide more specific information about the specific regions. That is, the impeller assemblies 404a-404d may be in contact with different fluids and/or may provide additional information that further indicates the flow regime.

Figure 4B:
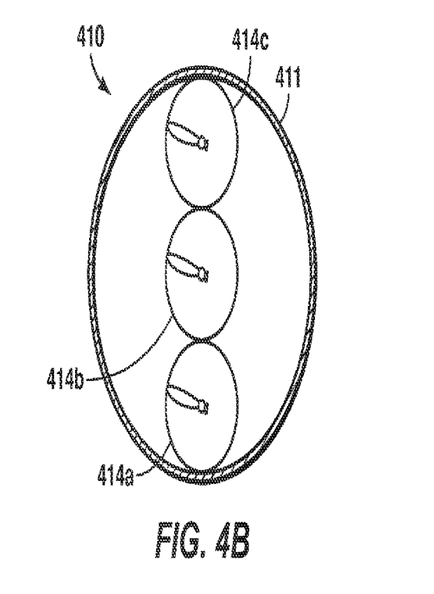
Figure 4C:
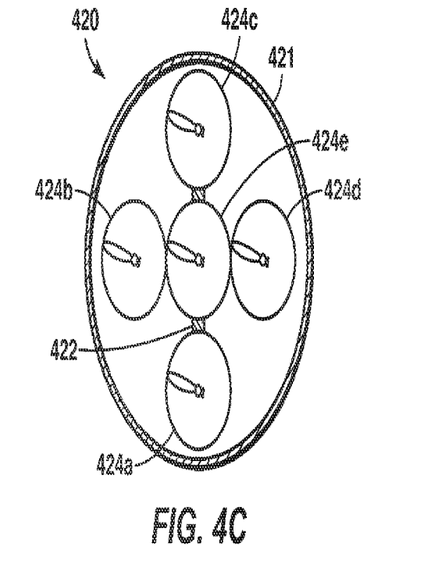
Figure 4D:
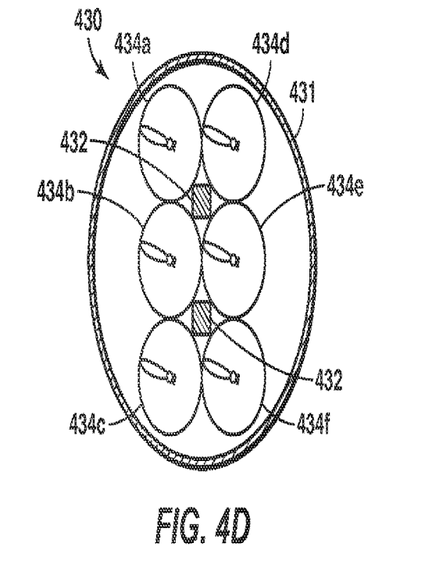

FIGS. 4B to 4D are other alternative embodiments that may be utilized. In particular, FIG. 4B is a configuration 410 of three asymmetric impeller assemblies 414a-414c coupled together and disposed within an enclosed passage 411. In FIG. 4C, the configuration 420 has five asymmetric impeller assemblies 424a-424e coupled together with support member 422 and disposed within an enclosed passage 421. Finally, configuration 430 in FIG. 4D has six asymmetric impeller assemblies 434a-434f coupled together with a support structure 432 and disposed within an enclosed passage 431. Each of these different configurations may be utilized to obtain measurement data for different regions of the enclosed passage. As may be appreciated, the impeller assemblies may be configured to be in substantially the same cross sectional area of the enclosed passage or may be configured to be distributed along the longitudinal axis of the enclosed passage (e.g., one or more of the impeller assemblies may be in different cross sectional areas of the enclosed passage).

In addition, the spinner flow meter having an asymmetric blade configuration may be utilized with other flow meters or impeller assemblies to enhance the collected information.

As one example, the spinner flow meter having an asymmetric blade configuration may be utilized with a conventional spinner flow meter with a symmetric blade configuration (with a corresponding measurement sensor). In such configuration, the conventional flow meter impeller assembly (i.e., with symmetrically distributed blades) provides the weighted average of the local flow velocities, while the asymmetric impeller assembly returns the deviation from that average given by each fluid phase. Additionally, the presence of a symmetric impeller implies that at least one portion of the impeller is immersed in the denser fluid, thus ensuring that the shaft is rotating even with minimal liquid flow. In combination with the consistent inertia provided by the conventional flow meter impeller, this contributes to a more accurate response to the overall flow. Finally, the flow meter with the symmetric blade configuration may be utilized to determine noise present in the system and/or to lessen the noise in the processing of the collected information. That is, the flow meter with the symmetric blade configuration measures the variation of fluid flow velocity over a longer time period that may involve one or more rotations of the impeller, while the flow meter with the asymmetric blade configuration measures the variation of fluid flow velocity over a second, shorter time period that involves a portion of a revolution of the impeller.

As an example, in one or more embodiments, one asymmetric impeller flow meter may be utilized together with a symmetric impeller flow meter to further enhance the flow rate information. The addition of further asymmetric blade assemblies may enhance the accuracy of the detection and increase the information set on the local flow. Because blades are optimized for one fluid, the presence of multiple asymmetric impellers whose asymmetry is properly distributed along the azimuthal direction may enhance the overall response to the multi-phase flow. In a configuration with multiple asymmetric impellers, each impeller can be designed to be optimal for a different fluid or phase. In this configuration, the rotation velocity of the blade may remain sufficiently constant and the torque between blades can be measured, as it varies over each rotation. The one or more sensors should measure the torque between blades for the blade configurations. Each of the torque sensors may be disposed on the shaft member and associated with one of the asymmetric blade configurations. The torque sensors may detect the change in force experienced by the blade as it interacts with different phases in the passage. Again, at least one counter weight is utilized on the shaft to maintain the center of gravity on the rotation axis for the entire assembly. Their distribution along the shaft should be taken into account for a proper calibration of the measurements.

Figure 5:
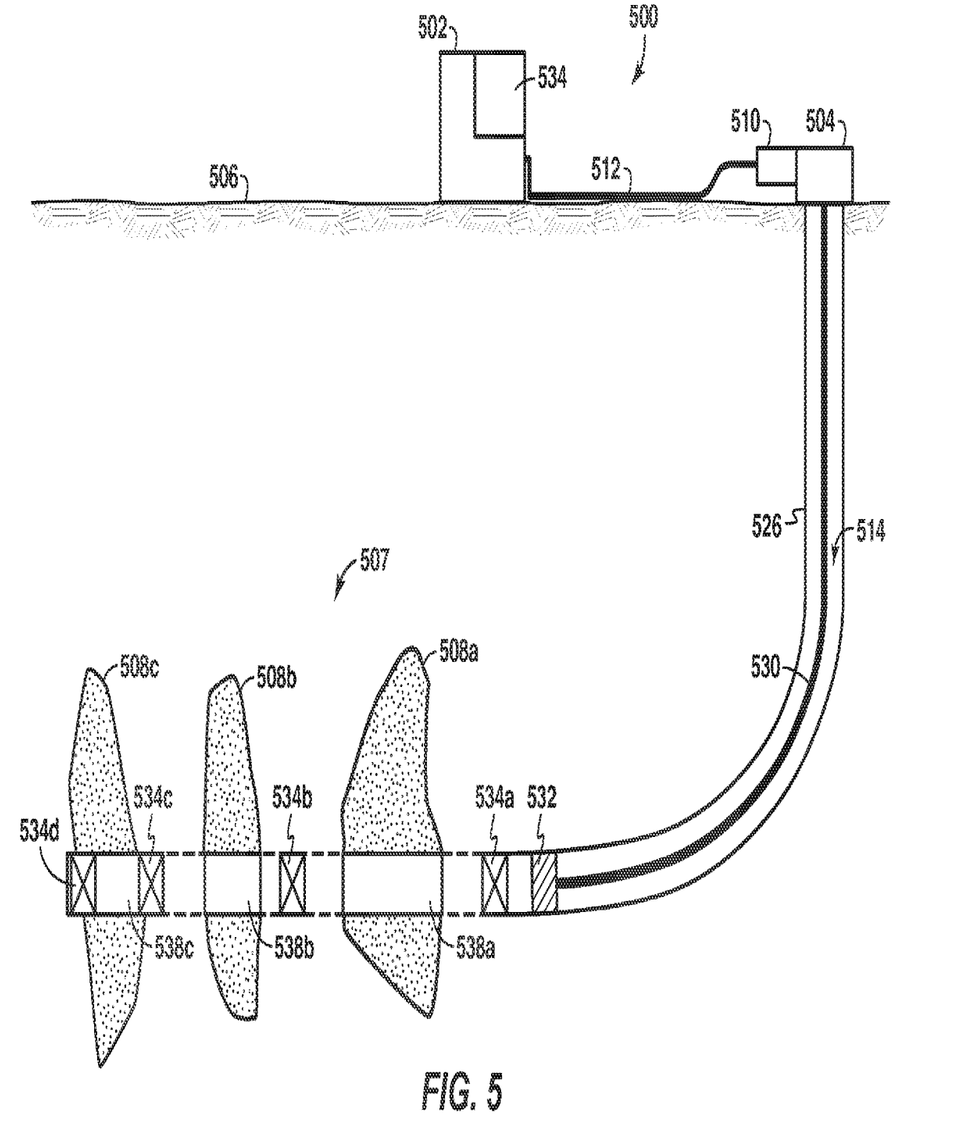
FIG. 5 is an exemplary production system in accordance with certain aspects of the present techniques.

Turning now to FIG. 5, an exemplary production system 500 in accordance with certain aspects of the present techniques is illustrated. In the exemplary hydrocarbon production system 500, a production facility 502 is coupled to a tree 504 located on the surface 506. Through this tree 504, the production facility 502 accesses one or more subsurface formations, such as subsurface formation 507, which may include multiple production intervals or zones 508a, 508b and 508c having hydrocarbons, such as oil and gas, and may also include water. In this embodiment, the flow meter 532, which includes at least one asymmetric blade configuration and associated sensor, may be utilized to provide measurement data associated with multi-phase fluid flow within the wellbore 514. Then, an indication associated with the measurement data and/or the measurement data may be communicated to a process control unit 534 and utilized to manage the flow control devices 538a, 538b and 538c. The flow control devices 538a, 538b and 538c may be utilized to enhance the production of hydrocarbons from the production intervals 508a, 508b and 508c. However, it should be noted that the production system 500 is illustrated for exemplary purposes and the present invention may be used in the production or injection of fluids from any land and/or subsea location.

The production facility 502 is configured to monitor and produce hydrocarbons from the production intervals 508a, 508b and 508c of the subsurface formation 507. The production facility 502 may include one or more units to process and manage the flow of production fluids, such as hydrocarbons and/or water, from the formation 507. These fluids may be stored in vessels or passed to a pipeline (not shown). To access the production intervals 508a, 508b and 508c, the production facility 502 is coupled to a tree 504 and control valve 510 via a control umbilical 512. The control umbilical 512 may include production tubing for passing fluids from the tree 504 to the production facility 502, control tubing for hydraulic or electrical devices, and a control cable for communicating with other devices within the wellbore 514.

To access the production intervals 508a, 508b and 508c, the wellbore 514 penetrates the surface 506 to a depth or location that interfaces with the production intervals 508a, 508b and 508c at different regions within the wellbore 514. The production intervals 508a, 508b and 508c, which may be referred to as production intervals 508, may include various layers or intervals of rock that may or may not include hydrocarbons and may be referred to as zones. The tree 504, which is positioned over the wellbore 514 at the surface 506, provides an interface between devices within the wellbore 514 and the production facility 502. Accordingly, the tree 504 may be coupled to a production tubing string 526 to provide fluid flow paths and a control cable (not shown) to provide communication paths, which may interface with the control umbilical 512 at the tree 504.

Within the wellbore 514, the production system 500 may also include different equipment to provide access to the production intervals 508a, 508b and 508c. For instance, a surface casing string (not shown) may be installed from the surface 506 to a location at a specific depth beneath the surface 506. Within the surface casing string, an intermediate or production casing string (not shown), which may extend down to a depth near the production intervals 508, may be utilized to provide support for walls of the wellbore 514. The surface and production casing strings may be cemented into a fixed position within the wellbore 514 to further stabilize the wellbore 514. Within the surface and production casing strings, a production tubing string 526 may be utilized to provide a flow path through the wellbore 514 for hydrocarbons and other fluids. Along this flow path, flow isolation devices 534a, 534b, 534c and 534d, such as valves and/or packers, may be utilized to isolate specific zones within the wellbore annulus from each other, as is known in the art. Further, the flow control devices 538a, 538b and 538c may be utilized to manage the flow of fluids into the wellbore from the respective production intervals 508a, 508b and 508c. These flow control devices 538a, 538b and 538c may include valves and/or sleeves and/or inflow control devices (ICD) and/or sand control equipment.

In addition to the above-mentioned equipment, other devices or tools may be utilized to manage the flow of fluids within the production tubing string 526. For instance, in one or more of the embodiments, a control mechanism may be utilized to monitor and manage the multi-phase fluid flow within the wellbore 514. The control mechanism may include a process control unit 534 coupled to one or more measurement devices 532, such as a spinner flow meter, that obtains measurement data (e.g., instantaneous flow velocity, average flow velocity, instantaneous phase velocity, instantaneous phase fraction, average phase regime and the like) and one or more flow control devices 538a, 538b and 538c for adjusting operational settings (e.g., amount of fluid flow from an interval into the wellbore 514 or the like). The process control unit 534, measurement device 532 and/or flow control devices 538a, 538b and 538c may communicate via a physical and/or wireless means. The flow meter may include one or more of the embodiments noted above.

The process control unit 534 may include a computer system along with one or more monitors and input/output components. The computer system may include memory to store sets of instructions, measurement data and processed measurement data. Further, the computer system may include a processor to execute the instructions and access the data and parameters. In this system, operational settings (e.g., physical settings of one or more flow control devices 538a, 538b and 538c) may be adjusted to manage the flow of fluids being provided from various portions of the wellbore 514. The operational settings may be represented by operating parameters within the computer system and may be stored as operational data in the memory. These operating parameters may be utilized by the processor in executing one or more of the sets of instructions to monitor, determine and/or model the flow of fluids through the wellbore. In this manner, the system may utilize the data or model results to adjust operational settings, and other similar operations.

The process control unit 534 may also communicate with the measurement device 532. The measurement device 532 may include one or more flow meters having an asymmetric blade configuration, one or more flow meters having a symmetric blade configuration and any combination thereof. One or more of these flow meters may include a processor, memory coupled to the processor and one or more sets of computer instructions stored in the memory and executed by the processor to obtain measurement data and transmit an indication related to the measurement data to the central processing unit.

As a specific example, the measurement device 532 may include one or more flow meters, such as one of the embodiments noted above. In such an example, the measurement device may include a data acquisition unit and/or sensors disposed within the measurement device 532. In such an embodiment, the central processing unit 534 may obtain measurement data from the one or more sensors 110 and/or the measurement data or processed measurement data from the data acquisition unit, which are part of the measurement device 532. The data acquisition unit may be utilized to manage the data for the measurement device 532 from different flow meters and/or sensors associated with the measurement device 532. In such a configuration, the data acquisition unit may include components and/or the set of instructions that are utilized to store, process and/or transmit the data to the central processing unit 534. In particular, the data acquisition unit may include a processor, memory in communication with the processor and a set of instructions stored on the memory and accessible by the processor. The processor may execute the set of instructions, which when executed by the processor, are configured to store the measurement data, process the measurement data into processed measurement data, store the processed measurement data and/or transmit an indication related to the processed measurement data to the central processing unit.

Along with the flow meter, the measurement device 532 may include different types of measurement equipment, such as a temperature measurement device. The temperature measurement device, which may include a thermocouple, may be configured to measure the temperature of the fluid flowing through the measurement device 532. These additional measurement devices may be utilized to adjust predicted or measured density and viscosity for the calibration of the flow meter.

Along with the flow meter, the measurement device 532 may include different types of measurement equipment, such as a pressure measurement device. The pressure measurement device may be configured to measure the pressure of the fluid flowing through the measurement device 532. These additional measurement devices may be utilized to adjust predicted or measured the density of the fluid for the calibration of the flow meter, or it may be used to better estimate the phase (liquid or solid) of different components in the fluid mixture.

The control mechanism may also include one or more control units configured to adjust different operational settings of one or more flow control devices 538a, 538b and 538c. For example, a flow control unit may be utilized and configured to receive operational settings and adjust the amount of fluid flow from one or more of the flow control devices 538a, 538b and 538c. In this manner, the system may control the amount of fluid being produced from the respective production intervals 508a, 508b and 508c of the subsurface formation 507.

The present techniques may utilize the measurement data relating to multi-phase fluid flow (e.g., instantaneous fluid flow). For example, the control mechanism may include a measurement device 532 that includes a flow meter having an asymmetric blade configuration and configured to measure the instantaneous fluid flow through the measurement device 532 along with a temperature/pressure measurement device configured to measure the temperature and/or the pressure of the fluid passing through the measurement device 532. The measurement device 532 may include data acquisition unit, such as data acquisition unit 116, which transmits the measurement data to other devices. Also, the control mechanism may also include a process control unit 534 having a set of instructions stored in memory and accessed via a processor, which are configured to (i) receive measurement data from the measurement device; (ii) to calculate the instantaneous volume fraction of the multi-phase flow; (iii) to calculate the local velocity of the individual phases; (iv) to extract a compressed subset of flow information from the large amount of measurement data originating from the sensors. This obtained flow information may be utilized to modify the operation of the system and/or adjust operating procedures for the system.

In yet another embodiment, the control mechanism may include a measurement device 532 that includes a flow meter having an asymmetric blade configuration and configured to measure the instantaneous fluid flow through the measurement device 532 along with one or more of temperature measurement device and pressure measurement device configured to measure the temperature and/or the pressure of the fluid passing through the measurement device 532. The measurement device 532 may include data acquisition unit, such as data acquisition unit 116, which includes a set of instructions stored in memory and accessed via a processor, which, when executed, are configured to (i) receive measurement data from the measurement device; (ii) to calculate the instantaneous volume fraction of the multi-phase flow; (iii) to calculate the local velocity of the individual phases; (iv) to extract a compressed subset of flow information from the large amount of measurement data originating from the sensors; and (v) transmit either the local velocity of the individual phases or an indication associated with such local velocities and temperature and pressure data, as well. This obtained data may be utilized to modify the operation of the system and/or adjust operating procedures for the system.

Based on the data from the measurement device (e.g., measurement data, local velocity data of the individual phases, temperature data and pressure data), the computer system of the process control unit 534 may make certain adjustments to the system. For example, the process control unit 534 may have a set of instructions stored in memory and accessed via a processor, which, when executed, are configured to (i) receive data (e.g., measurement data, local velocity data of the individual phases, temperature data, pressure data or representations of such data) from the measurement device; (ii) to calculate the instantaneous volume fraction of the multi-phase flow; (iii) to calculate the local velocity of the individual phases; (iv) to extract a compressed subset of flow information from the large amount of measurement data originating from the sensors; transmit an indication to one or more flow control devices 538a, 538b and 538c to adjust operational settings (e.g., amount of fluid flow from an interval into the wellbore 514 or the like). In this manner, the system may be utilized to further manage the flow of operation of the system in an enhanced manner.

In one or more embodiments, measurement device including one or more flow meters may be utilized to manage operation of a system. For example, the measurement device 532 may be passed through the wellbore 514 via wireline or may also be configured to be a static member disposed within the wellbore 514. If the measurement device 532 is passed via wireline, it may be moved through the wellbore 514 to obtain measurement data. This measurement data may then be transmitted to a processor, such as the process control unit 534 or other unit, to determine the fluid flow at the various locations within the wellbore 514. The measurement device may be removed from the wellbore once the measurement data has been obtained. Once this measurement data has been processed, an indication (e.g., a chart, a graph or text) of the different multi-phase flow at different locations within the wellbore 514 may be provided to the process control unit 534 and/or displayed on a device. Based on this indication, the flow control devices 538a, 538b and 538c may be utilized to manage the flow of fluids into the wellbore 514. This may include the process control unit 534 transmitting a signal to one or more of the flow control devices 538a, 538b and 538c. The hydrocarbons may then continue to be produced from the wellbore 514.

In another configuration, the measurement device 532 may be secured within the wellbore 514 for continual use or may be activated at certain times to provide fluid flow information. In particular, the measurement device may be installed in a bypass conduit that may be activated to divert flow from the wellbore 514 into the bypass conduit. As another example, the measurement device 532 may be activated and moved into the wellbore at a specific location. Regardless, the measurement device 532 may obtain measurement data. The processing and use of the measurement data may be similar to the wireline based measurement device. Once the measurement data has been obtained, the measurement device may be deactivated, which may include preventing flow to the bypass conduit and/or removed the measurement device from the wellbore flow.

Further, in one or more embodiments, the flow meter, which may include one or more of the flow meters noted above, may be configured to utilize a power source to rotate the one or more blades in an asymmetric blade configuration. In this configuration, which may be referred to as a propeller assembly, the power source may include an engine, turbine, battery or other suitable power source. This power source may be disposed within the shaft assembly or other suitable location. The propeller assembly may be configured to rotate at a specific speed based on the energy supplied and one or more sensors may be configured to determine the energy utilized to maintain the rotation at a specific speed. The same information about the multi-phase flow provided by the configuration described above, such as the volume fraction and the local velocities of each phase, can similarly be extracted by the measurement of the energy required to maintain a constant speed.

Other embodiments are described in the following paragraphs:

1. A flow meter for measuring multi-phase flow comprising: an impeller assembly having a shaft assembly, wherein the shaft assembly comprises a shaft and the impeller assembly comprises: one or more blades in an asymmetric blade configuration and configured to impart rotation of the shaft from forces caused by contact with a fluid (or to rotate by fluid flow contact with blades in the impeller assembly), and one or more sensors associated with the one or more blades and configured to obtain measurement data associated with fluid flow for a partial torsion or partial rotation of different portions of the shaft corresponding to the locations where the blades are fastened to the shaft.

2. The flow meter of paragraph 1, wherein the measurement data comprises one or more of a force applied to the one or more blades for each partial rotation of the portions of the shaft where the one or more blades are fastened and the rotational speed of the portions of the shaft where the one or more blades are fastened.

3. The flow meter of any one of paragraphs 1 to 2, wherein the shaft assembly comprises a collar coupled to the one or more blades of the impeller assembly, wherein the collar is engaged with the shaft.

4. The flow meter of any one of paragraphs 1 to 3, wherein the one or more sensors comprise one or more of a speedometer, a strain gauge sensor and a torsional sensor.

5. The flow meter of any one of paragraphs 1 to 4, wherein the one or more sensors are configured to obtain measurement data for five or more time intervals per rotation of the one or more blades.

6. The flow meter of any one of paragraphs 1 to 4, wherein the one or more sensors are configured to obtain measurement data for ten or more time intervals per rotation of the one or more blades.

7. The flow meter of any one of paragraphs 1 to 6, wherein the one or more blades consists essentially of a single blade.

8. The flow meter of any one of paragraphs 1 to 7, further comprising a secondary impeller assembly comprising: one or more secondary blades in a second asymmetric blade configuration and configured to impart rotation of the shaft from forces caused by contact with a fluid (or to rotate by fluid flow contact with blades in the impeller assembly), and one or more secondary sensors associated with the one or more secondary blades and configured to obtain secondary measurement data associated with fluid flow for a partial torsion of different portions of the shaft corresponding to the locations where the secondary blades are fastened to the shaft.

9. A hydrocarbon production system comprising: a wellbore accessing one or more intervals within a subsurface formation; a measurement device disposed within the wellbore, the measurement device comprising a flow meter having one or more blades in an asymmetric blade configuration and configured to impart rotation of the shaft from forces caused by contact with a fluid, wherein the flow meter is configured to obtain measurement data associated with the fluid flow through the flow meter for a partial rotation of the one or more blades; and a central processing unit in communication with the measurement device and configured to: receive data, wherein the data comprises one or more of (i) an indication of the measurement data, and (ii) the measurement data; and process the received data to determine the fluid flow within the wellbore.

10. The production system of paragraph 9, wherein the flow meter comprises: an impeller assembly having a shaft assembly, wherein the shaft assembly comprises a shaft and the impeller assembly comprises: one or more blades in an asymmetric blade configuration and configured to impart rotation of the shaft from forces caused by contact with a fluid (or to rotate by fluid flow contact with blades in the impeller assembly), and one or more sensors associated with the one or more blades and configured to obtain the measurement data.

11. The production system of any one of paragraphs 9 to 10, wherein the one or more blades consists essentially of a single blade and counter weight.

12. The production system of any one of paragraphs 9 to 11, wherein the flow meter comprises: a secondary impeller assembly coupled to the shaft assembly, the secondary impeller assembly comprising: one or more secondary blades in a second asymmetric blade configuration and configured to impart rotation of the shaft from forces caused by contact with a fluid, and one or more secondary sensors associated with the one or more secondary blades and configured to obtain secondary measurement data; wherein the central processing unit is configured to: receive secondary data, wherein the secondary data comprises one or more of (i) an indication of the secondary measurement data, and (ii) the secondary measurement data; process the received secondary data to determine the multi-phase fluid flow properties at each location along the well (volume fraction and local velocity of each phase).

13. The production system of any one of paragraphs 9 to 12, wherein the measurement device further comprises a symmetric flow meter having one or more blades in an symmetric blade configuration and configured to rotate based on fluid flow through the symmetric flow meter, wherein the flow meter is configured to obtain symmetric measurement data associated with the fluid flow through the symmetric flow meter; and wherein the central processing unit is configured to: receive symmetric measurement data, wherein the symmetric measurement data comprises one or more of (i) an indication of the symmetric measurement data, and (ii) the symmetric measurement data; and process the received symmetric data to determine local velocity of the fluid within the wellbore.

14. The production system of any one of paragraphs 9 to 13, wherein the fluid flow within the wellbore is multi-phase fluid flow.

15. A method of managing fluid flow within a passage comprising: traversing a flow meter through a fluid flow within a passage, wherein the flow meter comprises one or more blades in an asymmetric blade configuration and configured to rotate based on the fluid flow within the passage adjacent to the flow meter, wherein the flow meter is configured to obtain measurement data associated with the fluid flow for a partial rotation of the one or more blades; and calculating fluid flow within the wellbore based on the measurement data.

16. The method of paragraph 15, wherein the fluid flow within the passage is multiple phase fluid flow.

17. The method of any one of paragraphs 15 to 16, wherein the passage is a wellbore.

18. The method of any one of paragraphs 15 to 17, wherein the flow meter measures one or more of a force applied to the one or more blades for each partial rotation of the one or more blades and a rotational speed of the one or more blades for each partial rotation of the one or more blades.

19. The method of any one of paragraphs 15 to 18, wherein the flow meter comprises one or more sensors configured to collect the measurement data and the one or more sensors comprise one or more of a speedometer, a strain gauge sensor and a torsional sensor.

20. The method of any one of paragraphs 15 to 19, wherein the flow meter is configured to obtain measurement data for five or more time intervals per rotation of the one or more blades.

21. The method of any one of paragraphs 15 to 19, wherein the flow meter is configured to obtain measurement data for ten or more time intervals per rotation of the one or more blades.

22. The method of any one of paragraphs 15 to 11, wherein the one or more blades consists essentially of a single blade and counter weight.

23. The method of any one of paragraphs 15 to 22, further comprising calculating the velocity of each phase of the fluid flow using the measurement data from the flow meter.

24. The method of any one of paragraphs 15 to 23, further comprising calculating the volume fraction of each phase of the fluid flow relative to the total volume of the fluid flow within the passage.

All documents described herein are incorporated by reference herein, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

What is claimed is:

1. A flow meter for measuring multi-phase flow comprising:
   an impeller assembly comprising;
   (i) a shaft;
   (ii) a single impeller blade fixedly engaged with the shaft, the impeller blade configured to impart rotation of the shaft from forces caused by contact by the impeller blade with a flowing fluid; and
   one or more sensors associated with the impeller assembly and configured to obtain measurement data associated with fluid flow, the obtained measurement data from the sensors including for each of a plurality of angular positions around a circumference of rotation of the single blade, each of the plurality of angular positions representing a position of the blade within a rotational tolerance range, and for each of the angular positions the obtained measurement data including at least one of a partial torsion, and a partial velocity.

2. The flow meter of claim 1, wherein the measurement data comprises one or more of a force applied to the impeller blade for each partial rotation of the portions of the shaft where the impeller blade is fastened and the rotational speed of the portions of the shaft where the impeller blade is fastened.

3. The flow meter of claim 1, wherein the shaft assembly comprises a collar coupled to the impeller blade of the impeller assembly, wherein the collar is engaged with the shaft.

4. The flow meter of claim 1, wherein the one or more sensors comprise one or more of a speedometer, a strain gauge sensor and a torsional sensor.

5. The flow meter of claim 1, wherein the one or more sensors are configured to obtain measurement data for five or more time intervals per rotation of the impeller blade.

6. The flow meter of claim 1, wherein the one or more sensors are configured to obtain measurement data for ten or more time intervals per rotation of the impeller blade.

7. A hydrocarbon production system comprising:
   a wellbore accessing one or more intervals within a subsurface formation;
   a measurement device disposed within the wellbore, the measurement device comprising a flow meter having a single blade impeller and configured to impart rotation of a shaft from forces caused by contact with a fluid, wherein the flow meter is configured to obtain measurement data associated with the fluid flow through the flow meter, the obtained measurement data from the sensors including for each of a plurality of angular positions around a circumference of rotation of the single blade, each of the plurality of angular positions representing a rotation position of the blade within a rotational tolerance range, and for each of the angular positions the obtained measurement data including at least one of a partial torsion and a partial velocity of the impeller blade; and
   a central processing unit in communication with the measurement device and configured to:
   receive data, wherein the data comprises one or more of (i) an indication of the measurement data, and (ii) the measurement data;
   process the received data to determine the fluid flow within the wellbore.

8. The production system of claim 7, wherein the flow meter comprises:
   an impeller assembly having a shaft assembly, wherein the shaft assembly comprises a shaft and the impeller assembly comprises:
   one or more sensors associated with the impeller blade and each of the one or more sensors configured to obtain the measurement data.

9. The production system of claim 7, wherein the impeller blade consists essentially of a single blade and a counter weight.

10. The production system of claim 7, wherein the fluid flow within the wellbore is multi-phase fluid flow.

11. A method of managing fluid flow within a passage comprising:
   traversing a flow meter through a fluid flow within a passage, wherein the flow meter comprises a single impeller blade fixedly engaged with a shaft and configured to rotate based on the fluid flow within the passage adjacent to the flow meter, wherein the flow meter is configured to obtain measurement data associated with the fluid flow for a partial rotation of the impeller blade, the obtained measurement data from the sensors including for each of a plurality of angular positions around a circumference of rotation of the single blade, each of the plurality of angular positions representing a rotation position of the blade within a rotational tolerance range, and for each rotation position the obtained measurement data including at least one of a partial torsion and a partial velocity of the impeller blade; and calculating fluid flow within the wellbore based on the measurement data.

12. The method of claim 11, wherein the fluid flow within the passage is multiple phase fluid flow.

13. The method of claim 11, wherein the passage is a wellbore.

14. The method of claim 11, wherein the flow meter measures one or more of a force applied to the impeller blade for each partial rotation of the impeller blade and a rotational speed of the impeller blade for each partial rotation of the impeller blade.

15. The method of claim 11, wherein the flow meter comprises one or more sensors configured to collect the measurement data and the one or more sensors comprise one or more of a speedometer, a strain gauge sensor and a torsional sensor.

16. The method of claim 11, wherein the flow meter is configured to obtain measurement data for five or more time intervals per rotation of the impeller blade.

17. The method of claim 11, wherein the flow meter is configured to obtain measurement data for ten or more time intervals per rotation of the impeller blade.

18. The method of claim 11, wherein the impeller blade consists essentially of a single blade and a counter weight.

19. The method of claim 11, further comprising calculating the velocity of each phase of the fluid flow using the measurement data from the flow meter.

20. The method of claim 11, further comprising calculating the volume fraction of each phase of the fluid flow relative to the total volume of the fluid flow within the passage.

* * * * *